United States Patent [19]

Murphy et al.

[11] 4,143,892
[45] Mar. 13, 1979

[54] HOSE COUPLING

[75] Inventors: Michael J. Murphy, Denver, Colo.;
Dale E. McVey, La Harpe, Kans.;
David A. Slipcheck; Gene E. Stefano,
both of Littleton, Colo.

[73] Assignee: The Gates Rubber Company, Denver, Colo.

[21] Appl. No.: 851,335

[22] Filed: Nov. 14, 1977

[51] Int. Cl.² ............................................. F16L 39/02
[52] U.S. Cl. .................................. 285/149; 156/294;
156/305; 285/297
[58] Field of Search ................ 285/149, 297; 138/109;
156/294

[56] References Cited

U.S. PATENT DOCUMENTS

| 2,473,441 | 6/1949 | Muller | 285/149 |
| 2,940,778 | 6/1960 | Kaiser | 285/149 X |
| 3,318,620 | 5/1967 | Cullen et al. | 285/149 |
| 3,415,545 | 12/1968 | Frey et al. | 285/149 |
| 3,531,143 | 9/1970 | Horvath et al. | 285/149 |
| 3,936,118 | 2/1976 | Thiery et al. | 285/149 X |
| 4,033,612 | 7/1977 | Chevalier | 285/149 |

FOREIGN PATENT DOCUMENTS

| 209649 | 6/1960 | Austria | 285/149 |
| 1251110 | 9/1967 | Fed. Rep. of Germany | 285/149 |
| 2413057 | 12/1974 | Fed. Rep. of Germany | 285/149 |
| 1212816 | 10/1959 | France | 285/149 |

Primary Examiner—Thomas F. Callaghan
Attorney, Agent, or Firm—Curtis H. Castleman, Jr.;
Raymond Fink; H. W. Oberg, Jr.

[57] ABSTRACT

A reinforced hose and coupling assembly is disclosed having an outer coupling body sleeve which flares outwardly toward to the fitting end of the coupling, with metal ply reinforcement nonuniformly distributed adjacent the coupling sleeve and being embedded in an anchoring matrix.

16 Claims, 4 Drawing Figures

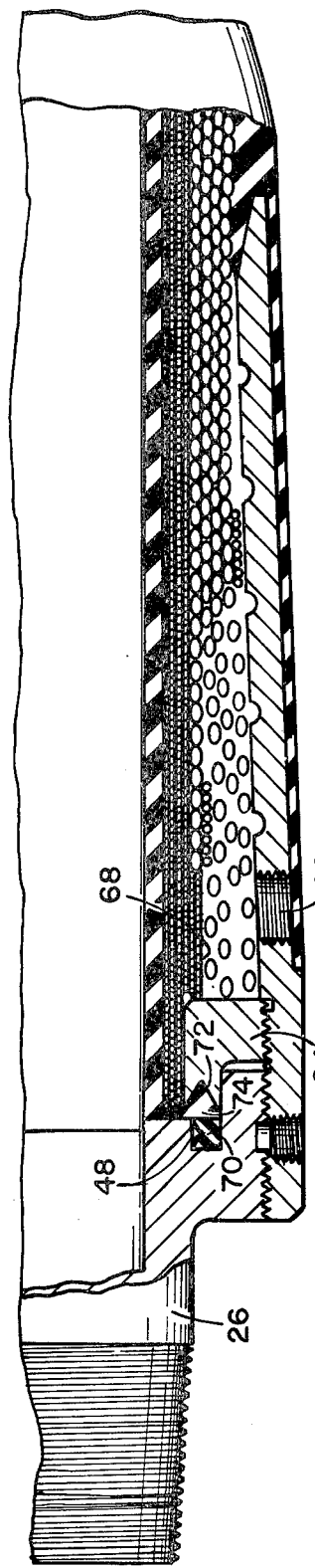
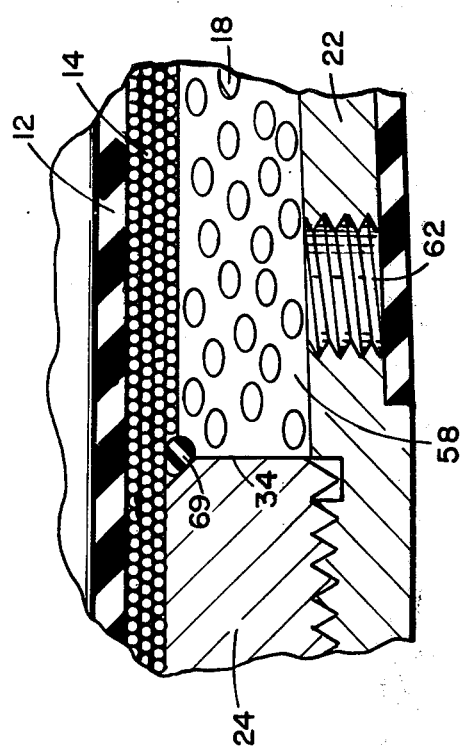

HOSE COUPLING

BACKGROUND OF THE INVENTION

This invention relates to reinforced hose couplings and assemblies, and to a method of forming the same, and particularly relates to the coupling of heavy duty hose having multiple plies of reinforcement.

In the design of coupling assemblies for fairly heavy duty hose, for instance rotary drill, choke and kill and motion compensator hose, aside from end seal reliability, an important criteria is the reduction in length and weight of the coupling without compromising working and burst pressure capability. One approach that has been taken is to taper the coupling sleeve into a frustroconical shape with an enlarged end adjacent the nipple of the coupling. At the base of this frustrum, the pitch of certain of the wire reinforcements has been increased in stepped fashion with the individual wires of increased pitch being longitudinally and/or radially uniformly spaced apart, and then embedded in an anchoring matrix of polymeric material, such as epoxy resin. The taper of the cone and anchoring of the spread wires maintains attachment between the hose and coupling under normal operation.

Despite the effectiveness of the mentioned frustroconical design, prior coupling assemblies have been bulky and expensive to manufacture primarily because of the special treatment required to spread the wires evenly apart at the base of the frustrum, and the numerous parts utilized in the overall assembly.

In addition to the foregoing statement concerning the prior art, additional relevant references include U.S. Pat. Nos. 2,473,441 (Muller), 2,506,494 (Feiler et al), 2,940,778 (Kaiser) and 3,217,282 (Chevalier et al).

SUMMARY OF THE INVENTION

In one aspect, the invention is drawn to a coupling including a coupling body sleeve having an inner bore of nonuniform dimension progressing to an enlarged zone near one end thereof; a connecting ring coupled to the sleeve within the inner bore and having, adjacent the enlarged zone, a generally radially extending first shoulder, and having a first counterbore coaxial with the bore of the sleeve; an end adapter coupled to the sleeve at said one end, and having a second shoulder stepped radially inwardly from the first shoulder and adjacently spaced from the connecting ring, and having a through bore coaxial with the bore of the sleeve and of lesser dimension than the first counterbore; and port means in the assembly in fluid communication with the enlarged zone adapted to convey an injection of anchoring material.

In another aspect, the invention relates to the combination of a reinforced hose and coupling assembly, having respective hose and fitting ends, and including a coupling body sleeve having an inner bore of differing dimension progressing from a lesser dimension at the hose end of the assembly to an enlarged zone near the fitting end thereof; a ring portion coupled to the sleeve within the inner bore and having, adjacent the enlarged zone, an inwardly directed shoulder, and having a counterbore coaxial with the sleeve and of lesser dimension than the enlarged zone of the sleeve inner bore; hose tube axially disposed within the sleeve and positioned adjacent the counterbore of the ring; multiple plies of reinforcement filaments disposed between the tube and inner bore of the sleeve, the filaments of the plies in the hose end of the coupling being relatively closely and uniformly spaced, and at least a substantial portion of the filaments of the plies in the enlarged zone being randomly distributed and spaced farther apart than the filaments in the hose end of the coupling and being embedded in an anchoring matrix material.

In a further aspect, the invention pertains to a method for coupling a hose comprising tube or carcass, and plies of wire, to an assembly having respective hose and fitting ends, including the steps of (a) providing an uncured hose preform including an inner tube, and telescoped multiple plies of bound down wire reinforcement, the tube and reinforcement being offset such that the tube extends endwise past at least a substantial portion of the wire reinforcement; (b) inserting the tube extended end of the hose preform into a coupling body sleeve having an inner bore whose dimension increases from a lesser dimension at the hose end of the assembly to an enlarged zone near the fitting end thereof, and fitted with a shouldered abutment adjacent the enlarged zone, in such a manner that at least a substantial portion of the bound wire reinforcement is spaced a substantial distance from the abutment thereby defining an annular void in the enlarged zone; (c) releasing wires which are spaced from the abutment into the annular void, permitting the released wires to spread apart and be distributed into the enlarged zone and be confined by the inner tube, inner bore of the sleeve, and abutment; (d) delivering into the enlarged zone occupied by the released wires, an anchoring material to fixedly embed wires therein; and (e) sealing the inner tube to the assembly and curing the hose.

BRIEF DESCRIPTION OF THE DRAWINGS

The invention will be more particularly described as to its preferred embodiments by reference to the accompanying drawings, in which like numerals designate like parts, and in which:

FIG. 3 is a partial sectional view longitudinal through the coupling and hose assembly embodying an alternative construction of the invention;

FIG. 4 is an enlarged partial sectional view in the area of the enlarged zone of the embedded reinforcements according to an alternative embodiment of the invention.

PREFERRED EMBODIMENTS OF THE INVENTION

Figure 1:
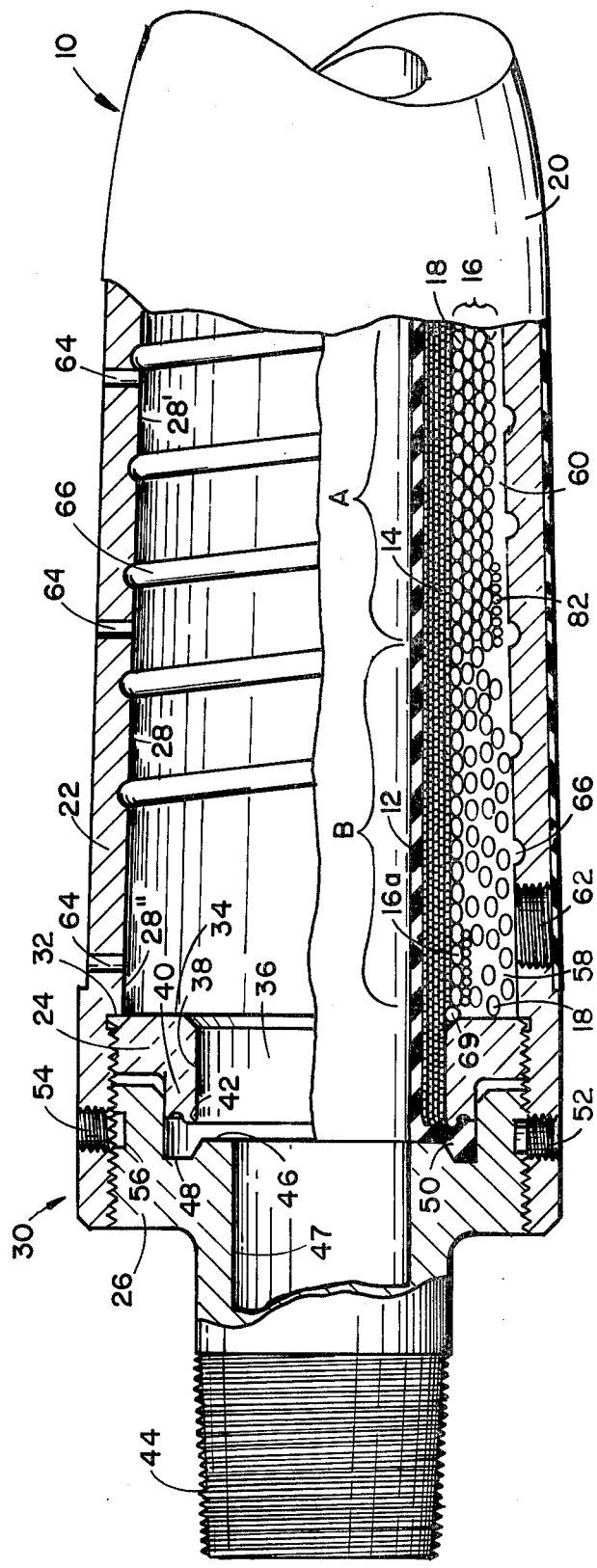
FIG. 1 is a partial cutaway sectional view longitudinal through a hose and coupling embodying the invention.

Referring to FIG. 1, the hose portion of the assembly is shown generally at 10, and includes an elastomeric tube 12, multiple plies of carcass textile reinforcement 14 embedded in or adjacent the tube, cover 20, and a sandwiched reinforcement section 16. In this embodiment, the reinforcement section is composed of four plies of helically wound wire filaments 18.

The coupling assembly generally includes outer coupling body sleeve 22, and co-threaded connecting ring 24 and end adapter 26.

The sleeve 22 has an inner bore 28 having a nonuniform bore dimension which progresses generally from a minimum dimension at the hose end 28' of the sleeve to an enlarged, preferably maximum bore dimension in the enlarged zone 28" near the fitting end 30 of the assembly. In the preferred embodiment shown, the inner bore of the sleeve tapers gradually toward the fitting end in frustro-conical fashion. Alternatively, the inner bore may stair-step, for instance, with the same overall progression of increasing diameter toward the fitting end of the assembly.

Ring 24 is threadedly engaged into the sleeve inner bore and positioned against stop 32. The ring has, adjacent the enlarged zone 28", a generally radially extending annular shoulder 34, and a counterbore 36 coaxial with the inner bore of the sleeve, defining a longitudinally extending surface 38. At the fitting end of the ring is formed a nipple 40 and an annular ridge 42. Alternatively, ring 24 may be integral with, (i.e., one in the same) or otherwise cojoined to the sleeve 22 such as by welding or press fitting.

The end adapter 26 may be the threaded nipple shown, adapted to couple other fittings via threads 44. The end adapter is also co-threaded into the fitting end of the sleeve 22, and has a second shoulder 46 and annular groove 48 which, together with the nipple 40 and protuberance 42 of the ring, form an end seal zone similar to that shown in the aforementioned U.S. Pat. No. 2,473,441. The shoulder 46 is spaced from nipple 40 to accommodate annular elastomeric sealing ring 50, which is either an inturned extension of or is a separate ring bonded or co-vulcanized to tube 12 of the hose, and which is compressed between the end adapter and connecting ring to form an end seal. An inward seal between the chamfered corner of ring 24 and carcass plies 14 is established with the air of rubber ring 69. The end adapter is provided with a through bore 47 of the approximate diameter of the tube of the coupled hose.

In use of the hose coupling assembly, adapter 26 is lockingly integrated with the rest of the assembly by the provision of one or more radially extending set screws 52 threaded into opening 54 and protruding into opening 56 formed in the adapter nipple.

As shown, the individual reinforcement filaments 18 are nonuniformly distributed within the frustro-conical annular volume determined by the spacing between the inner bore 28 and carcass layer 14. Whereas the filaments of the plies in the hose end 28' (shown approximately as zone A) are uniformly and preferably relatively closely spaced together (including touching), and filaments 18 in the enlarged zone 28" together with those extending rearwardly toward the hose end adjacent zone A (all defined as zone "B"), are at least in substantial portion randomly distributed. By such random distribution is meant that while some of the wire filaments may actually be in mutual contact, the overall distribution of wires and spacing therebetween does not follow a specific or predetermined pattern. Many of the wire filaments may be relatively far apart, and in general the bulk of the wires are spaced substantially farther apart than the wire filaments in zone A. In one preferred embodiment, the spacing between filaments in zone B becomes progressively and gradually greater toward the fitting end of the coupling (enlarged zone 28").

At least a substantial portion of the wire filaments in the enlarged zone 28", within zone B, are embedded in an anchoring matrix 58 (shown unsectioned), which may be a thermosetting resin such as epoxy, with high compressive strength. Such epoxy matrix may be loaded with reinforcing fibers, for instance. This provides the frustro-conical wire anchoring matrix composite to resist blow-off failure of the coupling. It is most preferred that the anchoring matrix extend into zone A, particularly within the annulus 60 formed between the outer ply of reinforcement and the inner bore 28.

Inlet port 62 is provided for injection of the anchoring material, and a plurality of ports 64 are provided for bleed off of excess material. The anchoring matrix may also lodge in recesses formed along the inner hose surface, such as helical grooves 66 formed in the inner bore 28 for added holding power. Such grooves may be formed in any desirable configuration e.g., stair-stepped.

In the embodiment in FIG. 1, the innermost ply of reinforcement 16a is uniformly closely spaced throughout zones A and B. The remaining three reinforcement plies, however, are randomly distributed in zone B in accordance with the invention. Having the innermost ply 16a maintained with the filaments in closely spaced relation offers the advantage of protection to the tube and carcass 14 against blow out in the area of the enlarged zone 28".

Alternatively as shown in FIG. 3, the blow out protection just described can also be served by the use of additional plies of carcass 68 in the area of the enlarged zone 28". In that embodiment, there is also shown a modified end seal having a chevron shaped pre-cured elastomeric ring 70 (or alternatively an O-ring could be used) to make sealing compressive contact between the annular groove 48 formed in the nipple end of the hose and a V-groove 72 formed in the connecting ring 24 and faced or filled with elastomeric material 74. In this embodiment, upon failure of chevron sealing ring 70, repair may be made simply by removing adapter 26 and replacing the worn sealing ring 70.

In the embodiment of FIG. 4, all four plies of reinforcement 16 are composed of wire filaments 18 which are spaced apart in random manner and embedded in matrix 58, and which are spaced farther apart than the wire filaments positioned at the hose end of the coupling (not shown). As with the other embodiments of the invention, the random spacing is believed to offer the important advantage of minimizing the chance of blow off of the coupling by eliminating shear planes (actually shear "cones") formed within the epoxy matrix between rows of the prior art uniformly radially spaced wire plies. With the invention, the wires are nonuniformly spaced in the radial direction to break up the continuity of the shear cones.

The hose coupling assembly of FIG. 1 is manufactured according to the following method. Initially, an uncured hose preform including inner tube 12, carcass layers 14 and reinforcement 16 is built up on a pole mandrel 76 in conventional fashion. The wires may preferably be applied spirally, ply-upon-ply. The tube material may suitably be formed of a natural or synthetic vulcanizable rubber, and the carcass plies 14 formed of a calendered fabric frictioned or skimmed with rubber, and which has been wrapped over the tube.

Figure 2:
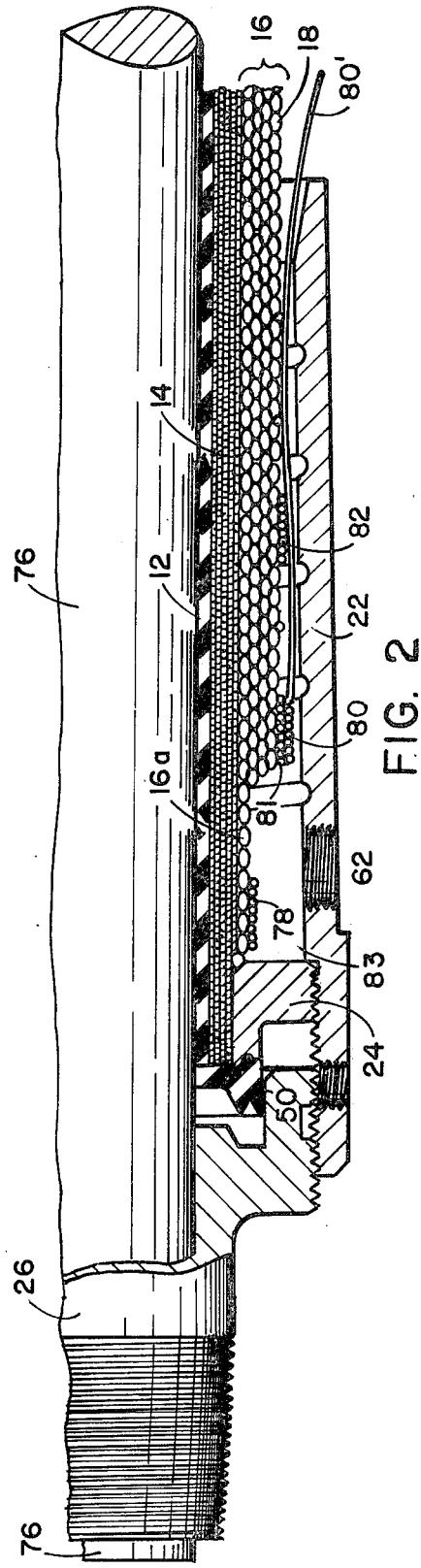
FIG. 2 is a partial sectional view depicting the hose and coupling assembly during an intermediate processing stage.

As shown in FIG. 2, to produce the coupling and hose assembly of FIG. 1, the tube and carcass, and the plies of wire reinforcement 16 are offset such an amount that the tube and carcass are approximately coextensive with the fitting end of the counterbore 38 of ring 24, the innermost ply 16a of reinforcement substantially abuts against shoulder 34 of the connecting ring, and the remaining plies of reinforcement are spaced a substantial distance longitudinally from the shoulder abutment 34. This latter spacing (zone B) will be from about 25 to about 75 and more preferably from about 40 to about 60 percent of the length of the coupling body sleeve bore 28. To ensure that the individual wire filaments 18 do not prematurely spread apart, they are immobilized. As shown, this may be accomplished by using relatively fine binding wire 78, 80, 82, at the desired locations. In the embodiment of FIG. 2, this may be accomplished by separately binding down the stepped portion in the area of the enlarged zone of the first ply 16a, and also a separate binding down at 82 of the plies at the forward end (fitting end) of the wires in zone A. Each of these two bindings are intended to be permanent and may remain in the finished assembly.

In addition to the bindings at position 78 and 82, there is also established a temporary binding down of the three remaining plies in the area of zone B with multiple convolutions 80. In a preferred manner, the convolutions or helices 80 are begun adjacent the hose end 28' of the reinforcement plies, and spiralled through zone A at a fairly large pitch and then laid at a very close pitch as shown at 80 within zone B until the most forward convolution 81 is laid. At this point, the convolutions are laid in the opposite direction back toward the hose end of the reinforcement, terminating in end 80'.

After the layered and telescoped end of the hose preform is inserted into the coupling subassembly consisting of outer sleeve 22 and ring 24, so that the plies 16a abut substantially against shoulder 34, the outer three plies of wire in zone B are released by pulling out the binding wire end 80'. As the binding wire 80' is pulled out toward the hose end of the assembly, the convolutions of wire 80 are uncoiled layer-by-layer until the binding has been removed and the individual wires 18 are permitted to spread apart. The wires, due to their inherent spring and resilience, displace and spread apart toward the fitting end of the hose, being confined within the annular void 83 determined by the inner bore of sleeve 22, the first layer 16a of wire ply, and shoulder 34 of the connecting ring.

The actual pattern of distribution of the released and spread apart wires within the enlarged zone, will vary, although the particular pattern and spacing shown in FIG. 1 is representative.

After the wires have been fully released, the anchoring material, e.g., epoxy resin, is introduced into port 62 in sufficient amount to embed at least a large portion of the spread apart wires in the anchoring matrix. Bleeding through ports 64 will indicate the approximate completion of the filling operation. Either before or after such epoxy filling operation, nipple 26, or alternatively a temporary end seal mold (not shown), is threaded into place as shown in FIG. 2, until the ring 50 makes compressive contact with connecting ring 24 and the fitting end of tube 12 and carcass 14. At this point, in conventional manner, a cover 20 may be applied to the outer reinforcements of the hose and also to cover a portion of the coupling body sleeve 22, a heat shrinkable curing tape applied to the cover, and the entire assembly cured in an autoclave using appropriate temperature and pressure to cause the rubber portions of the assembly to be vulcanized to form a unitary body.

Upon curing, the end seal mold, if employed, may be removed and replaced by nipple end adapter 26 to complete fabrication of the hose and coupling assembly.

The foregoing method may also be performed by removing the ring abutment 24 after delivering the epoxy into the coupling annulus and curing it, but prior to curing or vulcanizing the entire assembly. If the latter alternative is taken, a different end seal will be used, as those skilled in the art will appreciate.

It will be understood that a variety of modifications and variations may be employed without departing from the spirit and scope of the invention, as defined by the appended claims.

What is claimed is:

1. In combination, a reinforced hose and coupling assembly having respective hose and fitting ends comprising:
   a coupling body sleeve having an inner bore of differing dimension progressing from a lesser dimension at the hose end of the assembly to an enlarged zone near the fitting end thereof;
   a ring portion coupled to the sleeve within the inner bore and having, adjacent the enlarged zone, an inwardly directed shoulder, and having a counterbore coaxial with the sleeve and of lesser dimension than the enlarged zone of the sleeve inner bore;
   hose inner layer comprising tube and/or carcass axially disposed within the sleeve and positioned adjacent the counterbore of the ring;
   multiple plies of reinforcement filaments disposed between the hose inner layer and inner bore of the sleeve, the filaments of the plies in the hose end of the coupling being relatively closely and uniformly spaced, and at least a substantial portion of the filaments of the plies which extend beyond the hose end together with the filaments in the enlarged zone (zone "B", FIG. 1) being randomly distributed and spaced farther apart than the filaments in the hose end of the coupling and being embedded in an anchoring matrix material, a portion of the filaments in zone B making substantially direct contact with the hose inner layer.

2. The combination of claim 1 wherein the inner bore of the sleeve is frustro-conical in shape, tapering from a minor dimension at the hose end to a major dimension near the fitting end.

3. The combination of claim 1 wherein the hose inner layer comprises tube and carcass textile reinforcement positioned between the hose tube and filamentary reinforcement and which follows the counterbore of the ring.

4. The combination of claim 3 wherein additional plies of carcass reinforcement are positioned in the area of the enlarged zone bridging the shoulder of the ring to an innermost ply of the filamentary reinforcement.

5. The combination of claim 1 wherein the filaments of the innermost reinforcement ply are uniformly and closely spaced together from the hose end to the shoulder of the ring.

6. The combination of claim 1 wherein each of the plies in the enlarged zone have filaments randomly distributed and spaced farther apart than the filaments in the hose end of the coupling.

7. The combination of claim 1 wherein an end adapter nipple is coupled to the outer sleeve and has an annular indentation adjacent a juxtaposed annular surface of the ring and wherein an elastomeric bead attached to the hose inner layer is sandwiched between the annular indentation and annular surface to form a seal.

8. The combination of claim 7 wherein additionally there is positioned a removable precured elastomeric sealing ring between the annular indentation and elastomeric bead.

9. The combination of claim 1 wherein the filaments of the plies of the hose end of the coupling are surrounded by an outer annulus of anchoring matrix material.

10. The combination of claim 6 wherein an additional portion of the filaments in zone "B" makes substantially direct contact with the inner bore of the sleeve.

11. The combination of claim 1 wherein the spaced apart filaments are spaced apart randomly within substantially the entire volume of zone B.

12. A method of coupling a hose comprising an inner layer of tube and/or carcass, and plies of wire, to an assembly having respective hose and fitting ends, comprising the steps of:
 (a) providing an uncured hose preform including said inner layer, and telescoped multiple plies of bound down wire reinforcement, the inner layer and reinforcement being offset such that the inner layer extends endwise past at least a substantial portion of the wire reinforcement;
 (b) inserting the inner layer extended end of the hose preform into a coupling body sleeve having an inner bore whose dimension increases from a lesser dimension at the hose end of the assembly to an enlarged zone near the fitting end thereof, and fitted with a shouldered abutment adjacent the enlarged zone, in such a manner that at least a substantial portion of the bound wire reinforcement is spaced a substantial distance from the abutment thereby defining an annular void in the enlarged zone;
 (c) releasing wires which are spaced from the abutment into the annular void, permitting the released wires to spread apart and be distributed into the enlarged zone and be confined by the inner layer, inner bore of the sleeve, and abutment, a portion of the wires in the enlarged zone making substantially direct contact with the inner layer;
 (d) delivering into the enlarged zone occupied by the released wires, an anchoring material to fixedly embed wires therein;
 (e) sealing the inner layer to the assembly and curing the hose.

13. The method of claim 12 wherein the enumerated steps are performed in sequential order.

14. The method of claim 12 wherein after step d) is performed, and prior to performing step e), the abutment is removed.

15. The method of claim 12 wherein the anchoring material is a thermosetting resin injected in liquid form and permitted to solidify around individual wires that have spread apart upon releasing into the enlarged zone.

16. The method of claim 12 wherein the wire reinforcements are bound down by spiralling multiple convolutions of a binding filament about the wire reinforcement, and by providing an end of the binding filament exteriorly of the coupling assembly adapted to be manually pulled to thereby effect releasing of the wires according to step c).

* * * * *